July 16, 1968  V. E. BAKER  3,393,299
COUNTING MARKER
Filed Aug. 27, 1965
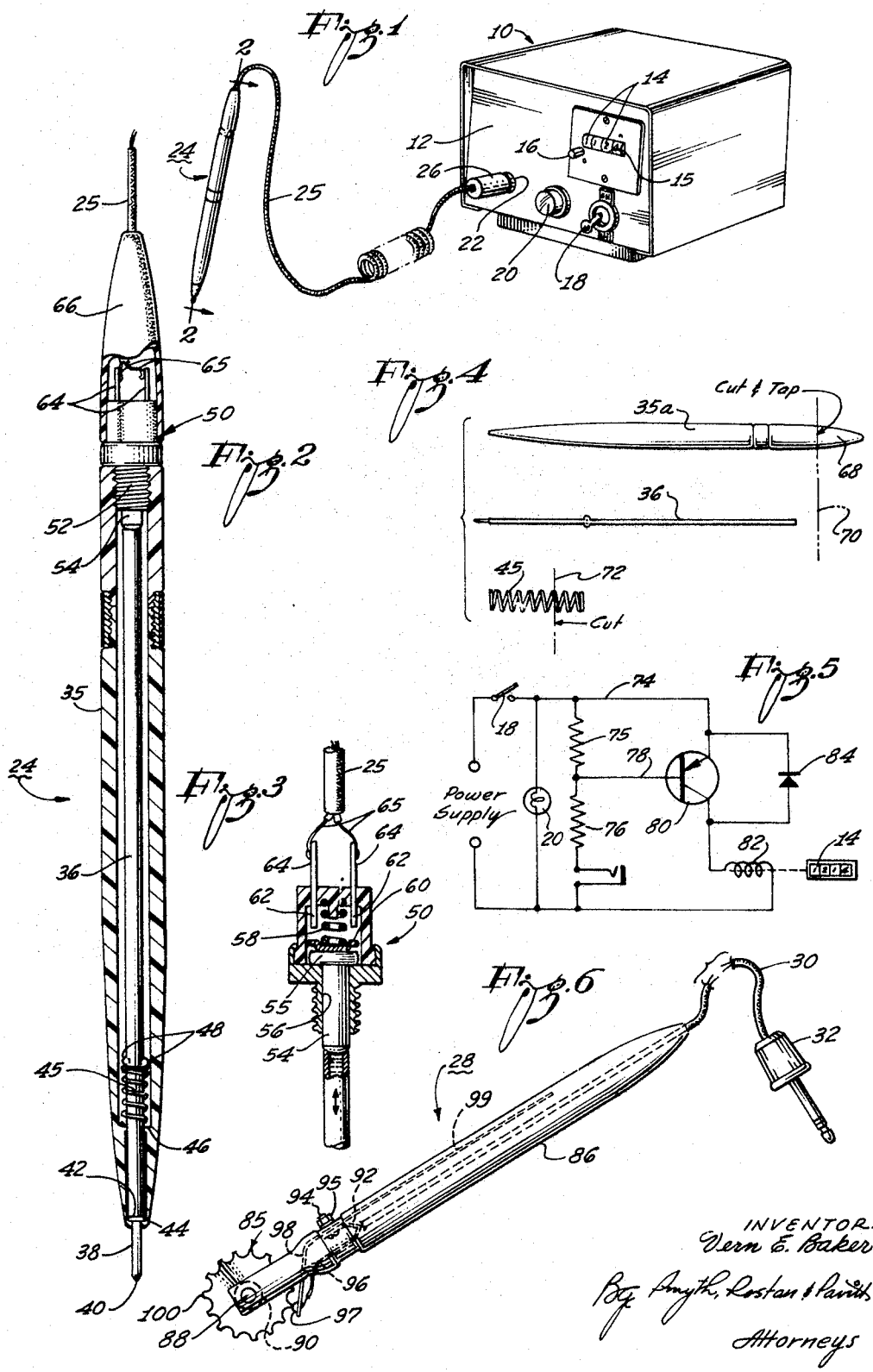

3,393,299
COUNTING MARKER
Vern E. Baker, Orange, Calif., assignor to Jack Strong Electric Co., Inc., Los Angeles, Calif., a corporation of California
Filed Aug. 27, 1965, Ser. No. 483,268
8 Claims. (Cl. 235—92)

ABSTRACT OF THE DISCLOSURE

This invention relates to apparatus for providing a count of the number of times that a pen makes a mark on a paper. The invention also relates to apparatus for indicating the distance that a pen is moved along a paper. The embodiments of the invention include a current-control member such as a semi-conductor operative in the conductive state during the positioning of the pen against the paper and a coil for producing a pulse upon each such positioning of the pen against the paper or upon each movement of the pen through a particular distance. Means are provided in such embodiments for insuring that the semi-conductor does not become damaged after each such flow of current through the coil.

---

This invention relates to devices for cooperation with an electrically actuated counter for such purposes as counting items on a map or drawing and for measuring distances on a map or a drawing. One form of the invention may be used, for example, in the manner of a pen to mark off and simultaneously count items such as the outlet boxes on an architectural drawing or the bacteria of a colony as viewed on an inverted glass Petri dish. A second form of the invention counts the revolutions of a wheel for ascertaining the distance the wheel moves along the surface of a map or the like.

In the first form of the invention, a marking pen incorporates a switch that controls an electrically actuated counter, the switch operating in response to marking pressure exerted by the pen. Since the working parts of this combination are primarily in the marking pen itself and since the marking pen is normally rapidly cycled when operated, the problem is encountered of not only providing such a marking pen that functions efficiently for its purpose but of also minimizing the cost of keeping such a marking pen in service over a long period of time. This cost, of course, depends on both the life expectancy and the initial cost of the pen. Thus a high initial cost may be justified by a long service life, or on the other hand, a short life may be justified by an exceptionally low replacement cost.

In this regard an important feature of the invention is the concept of an inexpensive procedure for converting a conventional ballpoint pen into a counter-controlling marking pen. Thus the invention takes advantage of the fact that efficiently constructed ballpoint pens are mass produced under highly competitive conditions and therefore are readily available at relatively low cost.

The invention further takes advantage of the fact that in a common type of ballpoint pen, the ballpoint element is axially movable in the barrel of the pen and is under the pressure of a coil spring that urges the unit towards a retracted idle position. The invention teaches that the axial ballpoint element may be yieldingly mounted to reciprocate in response to each application of marking pressure with each reciprocation operating a switch in the barrel of the pen for remote control of the counter.

Two problems must be met in carrying out this concept of economically converting a conventional mass produced ball point pen into a marking pen. The first problem is to provide an economical switch to respond to the retraction of the ballpoint element that is created by the application of marking pressure to the element. The second problem is to provide optimum marking sensitivity i.e. an optimum degree of yielding resistance of the ballpoint pen unit to applied marking pressure.

Both of these problems are solved by the discovery that an economical mass-produced pressure-responsive switch is of a size and construction that makes it readily adaptable for use in the barrel of a ballpoint pen. The commercially available pressure switch has an external screw thread and it is a simple matter to cut off a rear end portion of the barrel as may be necessary and then to cut an internal screw thread in the truncated barrel to receive the pressure sensitive switch.

Cutting off a rear end portion of the barrel is necessary for accurately locating the switch in a position for cooperation with the inner end of the axially movable ballpoint element. At this position of the switch, an operating plunger of the switch is maintained at an extended position in abutment with the end of the ballpoint element, the plunger being under pressure from a spring in the switch that normally keeps the switch open. At the same time the weaker retracting spring of the ballpoint pen itself yieldingly presses the axially movable ballpoint element against the pressure switch.

It is apparent that the sensitivity of the ballpoint pen element, i.e. its responsiveness to marking pressure, depends upon the relative strengths of the spring in the switch and the opposed spring of the ballpoint pen. The switch spring dominates but the opposite force exerted by the retracting spring determines how much added force must be created by marking pressure to cause the ballpoint element to actuate the switch. Fortuitously, conventional ballpoint pens are available in which the retracting springs are stronger than required for the purpose of the invention. Consequently precise adjustment of the marking sensitivity of the pen may be achieved simply by cutting off an appropriate end portion of the retracting spring of a conventional ballpoint pen.

A further feature of the invention is the combining with the marking pen a transistorized counter of efficient and economical construction. There are a number of advantages in controlling an electromagnetic counting mechanism by transistor circuit, but, unfortunately, each interruption of the counting circuit creates a counter electromotive surge that would damage the transistor. As will be explained, this problem is solved by shunting the emitter and collector of the transistor by a Zener diode.

Turning to the second form of the invention for measuring distances by means of a traction wheel that controls an electrically actuated counter, the same problem arises in that it is desirable to provide an efficient manually operable measuring wheel at a relatively low cost. In a convenentional device of this character, a counter-controlling switch separate and apart from the measuring wheel is operatively connected to the measuring wheel. For example, in one prior art arrangement, a cam on the same shaft as the measuring wheel operates a switch to open and close a counting circuit as the wheel rotates, there being two switch operating cycles for each revolution of the measuring wheel. Thus the counter measures half revolutions of the wheel.

In contrast, the present invention incorporates the measuring wheel itself into the switch construction. For this purpose the wheel itself is part of the counting circuit and the wheel is formed with numerous equally spaced peripheral teeth which serve as a series of switch contacts to brush against a cooperating stationary contact to open and close the counting circuit. In the preferred embodiment of the invention, the stationary switch contact is mounted on a resilient nonconducting arm which may be simply a suitable strip of plastic. It may be readily appreciated that such a construction not only minimizes the cost of the measuring wheel unit but also greatly increases accuracy since the counting circuit responds to small fractions of a revolution of the counting wheel.

A further feature of the preferred practice of the invention is the provision of a counter which is versatile in the sense that it may be used either to mark and count items or to measure distances. For this purpose a counting and marking pen constructed as above described is adapted for releasable connection to the counter and the previously described measuring wheel unit is also adapted for releasable connection to the counter. Thus the marking pen and the measuring wheel unit are interchangeable to provide a combination that has a wide range of potential applications.

The features and advantages of the invention may be understood from the following detailed description and the accompanying drawing.

In the drawing, which is to be regarded as merely illustrative:

FIG. 1 is a perspective view of the preferred embodiment of a marking pen operatively connected to a remote counter;

FIG. 2 is a longitudinal sectional view of the marking pen;

FIG. 3 is an enlarged sectional view of the pressure-sensitive switch that is incorporated into the construction of the marking pen;

FIG. 4 is a plan view of a conventional ballpoint pen together with the ballpoint element and the coil spring that exerts retractive force on the ballpoint element, the view indicating how an end portion of the pen is removed to receive the pressure-responsive switch and also showing how an end portion of the coil spring is removed to achieve the optimum degree of sensitivity of the marking pen to marking pressure;

FIG. 5 is a circuit diagram of the preferred embodiment of a counter that is connected to the marking pen; and FIG. 6 is a side elevational view of a measuring wheel unit that may be used with the counter, the measuring wheel unit being interchangeable with the marking pen.

FIG. 1 shows a counter, generally designated 10, having a front panel 12 with a set of number wheels 14 displaying numerals through a window 15. The number wheels 14 may be returned to zero by operation of a reset button 16. The counter circuit may be readied for operation by means of a toggle switch 18 with a lamp 20 indicating when the circuit is ready. The panel 12 is further provided with a jack 22 to permit various devices to be plugged into the counter.

FIG. 1 shows a marking pen, generally designated 24, connected by a two-conductor cord 25 to a plug 26 for insertion into the jack 22. FIG. 6 shows a manually operable measuring unit, generally designated 28, having a two-conductor cord 30 with a plug 32 for insertion in the jack 22 of the counter. Thus the marking pen 24 and the measuring unit 28 are adapted for interchangeable use with the counter 10.

The marking pen 24 which, as best shown in FIG. 2, has a barrel 35 enclosing a conventional ball pen element 36 which comprises an ink-containing tube from which extends a smaller tube 38 provided with the usual ballpoint 40. Normally the annular shoulder 42 of the ballpoint pen element 36 abuts an internal shoulder 44 of the barrel 35 and a coil spring 45 that surrounds the ballpoint pen element acts under compression in a well known manner between a second internal shoulder 46 of the barrel 35 and a pair of lugs 48 on the ballpoint pen element that are provided by locally deforming material of the element.

The rear end of the barrel 35 is formed with an internal screw thread to mount a pressure-responsive switch, generally designated 50, the switch being provided with an external screw thread 52. The pressure-responsive switch 50 may be of conventional construction purchased from Greyhill, 561 Hillgrove Ave., La Grange, Ill.

As shown in FIG. 3, the switch 50 has an operating plunger 54 with an inner head 55, the plunger being slidably mounted in a bore 56 and being normally at an advanced position under the pressure of a switch spring 58. The inner head 55 of the plunger carries a contactor 60 which cooperates with a pair of spaced contacts 62. The two contacts 62 are the inner ends of a pair of terminal members 64 which are connected to the two wires 65 of the previously mentioned cord 25. The rear portion of the switch 50 that extends beyond the barrel 35 may be enclosed by a protective elastomeric sock 66, as shown in FIG. 2. It is apparent that retraction of the plunger 54 in opposition to the switch spring 58 positions the conductor 60 to bridge the two contacts 62 to close a circuit for operating the counter 10.

It is to be noted that the coil spring 45 of the marking pen continuously urges the ballpoint pen element 36 against the end of the switch plunger 54. When the ballpoint pen point 40 is pressed with appreciable force against a surface to make a mark thereon, the ballpoint pen element 36 shifts axially to retract the switch plunger 54 in opposition to the switch spring 58. Since the two springs 45 and 58 are opposed to each other the amount of marking pressure applied to the ballpoint 40 that is necessary to retract the ballpoint pen element and thereby send a signal to the counter 10 will depend on the relative strengths of the two springs, i.e. will depend on the degree to which the strength of the switch spring 58 exceeds the strength of the spring 45.

FIG. 4 illustrates steps in the conversion of a conventional ballpoint pen into a marking pen in the presently preferred method of fabricating the marking pen. A rear end portion 68 is removed from the barrel 35a along the transverse broken line 70 to shorten the length of the barrel and thus produce the barrel 35 shown in FIG. 2. The line of cut 70 is selected to make the barrel 35 of a correct length relative to the length of the ballpoint pen element 36 to permit the ballpoint pen element to operate the pressure-responsive switch 50. The truncated end of the barrel is then internally threaded to receive the switch. It is a simple matter to install the switch 50 and to add the elastomeric sock 66.

Since the sensitivity of the marking pen 24, i.e. the magnitude of marking pressure that is necessary to close the switch 50 depends upon the relative strengths of the two springs 45 and 58, the sensitivity of the marking pen may be adjusted by adjusting the relative pressures of these two springs in the course of fabricating the marking pen. It has been found that the strength of the spring 45 of a conventional ballpoint pen always exceeds the desired strength for optimum sensitivity of a marking pen. Thus the required degree of sensitivity of the marking pen may be obtained by simply cutting off a portion of the spring 45 as indicated by the broken line 72 in FIG. 4.

It is contemplated that the counter 10 will incorporate a counting circuit of the character shown in FIG. 5. A suitable power source, for example a six volt battery (not shown) in the counter 10 is connected to two leads 74, one of which is interrupted by the previously mentioned switch 18. The indicator lamp 20 is connected across the two leads 74. The two leads 74 are shunted by two resistors 75 and 76 and the previously mentioned jack 22, the two resistors being in series with each other and with the jack. The resistor 75 may, for example, be a 100 ohm resistor and the resistance of resistor 76 may be 10 to 30 ohms. The juncture between the two resistors 75 and 76 is connected by a wire 78 to the base of a transistor 80 which may have a rating of two watts at thirty volts. The two leads 74 are also shunted by the emitter and collector of the transistor 80 in series with an actuating coil 82 that operates the counting wheels 14. Finnally, a twenty volt Zener diode 84 shunts the emitter and collector of the transistor.

When the switch 50 of the marking pen is closed, a negative voltage is produced in the base of the transistor 80 to make the transistor conductive, the negative voltage being produced because of the voltage dividing effect of the two resistors 75 and 76 and because of the bias on the emitter of the transistor. When the transistor 80 becomes conductive, current flows through the coil 82 to actuate the number wheels 14 to advance the count. At the instant that the switch 50 of the marking pen is opened by retraction by lifting the pen from the paper, a counter electromotive force is induced in the coil 82 with consequent reverse flow of current through the coil and the Zener diode 84. Thus the Zener diode 84 protects the transistor 80 against excessive current and in addition causes energy in the coil 82 to be introduced back into the power supply with a recharging effect on the power supply.

One advantage of the described counter circuit is that current of only relatively low amperage and relatively low voltage flows through the switch of the marking pen. Consequently the repeated switch operations do not result in burned contacts and the pressure-responsive switch has a relatively long service life. In addition the counter circuit conserves the life of the battery.

The measuring unit 28 shown in FIG. 6 is of a well known type in which a traction wheel 85 is mounted on a handle 86 so that the traction wheel may traverse a line on a map or the like to measure the length of the line. The handle 86 may comprise a metal barrel of a conventional ballpoint pen, the metal barrel being slotted at one end to receive the wheel 85 and the wheel being journalled on a suitable pivot pin 88. For the purpose of conducting electricity, the wheel 85 is made of metal and to assure continuous electrical communication between the wheel and the metal barrel 86, a suitable spring washer indicated in dotted lines at 90 may be mounted on the pivot pin 88 under pressure between the wheel and an adjacent portion of the metal barrel.

One wire 92 of the two wires of the cord 30 is grounded to the metal barrel 86 by a screw 94 that carries a nut 95. The other wire 96 of the cord is connected to a contact 97 on a flexible arm 98 of non-conducting material. The arm 98 may be an end portion of a resilient strip 99 of a suitable plastic material, the strip being anchored inside the barrel 86 by the screw 95.

The metal traction wheel 85 is formed with equally spaced peripheral teeth 100 which, for example, may be 1/8" apart. It is apparent that as the wheel 85 traverses a line on a piece of paper, the teeth 100 cooperate with the stationary contact 97 to repeatedly energize the counter circuit so that the number wheels 14 will indicate the total distance the wheel traverses in units of 1/8".

My description in specific detail of the presently preferred embodiment of the invention will suggest various changes, subsitutions and other departures from my disclosure within the spirit and scope of the appended claims.

I claim:

1. A marking and counting instrument, comprising:
a barrel having a leading end and an opposite end;
a marking element slidingly mounted in said barrel axially thereof and having a marking end protruding from the leading end of the barrel;
switch means mounted on the opposite end of the barrel, said switch means including an operating plunger in abutment with the inner end of the marking element;
a first spring means incorporated in said switch means and normally holding the plunger in an advanced position to keep the switch means open;
a second spring means weaker than the first spring means acting between the marking element and the barrel to press the marking element against the switch plunger;
whereby manipulating the barrel to cause the leading end of the marking element to make a mark, retracts the marking element to close the switch means in opposition to the first spring means and with the aid of the second spring means;
a counter housing;
a direct current power supply;
resistor means in the housing connected in series with said switch means, the resistor means and the switch means shunting the power supply;
counting means in the housing including a coil for actuation thereof;
a transistor in the housing having its base connected to the resistor means,
the emitter and collector of the transistor and said actuating coil shunting the power supply with the emitter and collector in series with the actuating coil; and
a Zener diode shunting the emitter and collector of the transistor to keep excessive current from flowing therethrough.

2. A marking and counting instrument, comprising:
a barrel having a leading end and an opposite end;
a marking element slidingly mounted in the barrel axially thereof and having a marking end protruding from the leading end of the barrel;
switch means mounted in the opposite end of the barrel, said switch means including an operating plunger in abutment with the inner end of the marking element;
a first spring means incorporated in said switch means and normally holding the plunger at an advanced position to keep the switch means open;
a second spring means weaker than the first spring means acting between the marking element and the barrel to press the marking element against the plunger,
whereby manipulating the barrel to cause the leading end of the marking element to make a mark retracts the marking element in opposition to the first spring means with the aid of the second spring means to close the switch means;
a current control member;
means, including the current control member, responsive to each operation of the switch means for causing a pulse to be produced in representation of a mark;
an electrically actuated counter electrically connected to said switch means for actuation thereby; and
means operatively coupled to the current control member and responsive to the production of each pulse for protecting the current control member after the production of the pulse.

3. In a marking pen for operating an electrically actuated counter, the combination of:
a barrel;
a plunger slidingly mounted in the rear end portion of the barrel for movement between a normal forward position and a rearward retracted position;
a counter;
normally open contact means cooperative with the plunger for closure in response to retraction of the plunger;
a switch spring normally holding the plunger at its forward position;
an elongated marking element mounted axially in the barrel with its forward end protruding from the barrel and with its rear end abutting the plunger for retraction of the plunger in response to marking pressure on the forward end of the element;
a coil spring in the barrel surrounding the marking element and acting between the barrel and the element to urge the element rearward against the plunger, the strength of the coil spring being less than the strength of the switch spring;
a semi-conductor having none-conductive and conductive states and normally in the non-conductive states;

a coil coupled to the counter to operate the counter upon the occurrence of a pulse in the coil;

means connected to the semi-conductor and the coil for producing a state of conductivity to provide a pulse in the coil upon each closure of the contact means; and means operatively coupled to the coil and the semi-conductor and responsive to the production of each pulse for protecting the semi-conductor after the closure of the pulse.

4. In a device of the character described for operating an electrically actuated counter for the purpose of measuring a distance on a surface, the combination of:

a traction wheel of conducting material with equally spaced peripheral teeth for frictionally engaging said surface;

a holder journalling the wheel;

a resilient finger of non-conducting material mounted on the holder and extending therefrom to the region of the periphery of the wheel;

a contact mounted on the resilient finger to touch the successive teeth as the wheel rotates; and two conductors for connection with the counter, one of the two conductors being connected to the contact, the other of the two conductors being in electrical communication with the wheel.

5. A combination as set forth in claim 4 in which at least a portion of the holder is made of conductive material in electrical communication with the wheel and said other of the two conductors is connected to said portion.

6. A combination as set forth in claim 4 in which a portion of the holder is made of conductive material and is connected to said other of the two conductors; and in which resilient conductor means abuts the side of the wheel to maintain electrical communication between the wheel and said portion of the holder.

7. The combination set forth in claim 6, including, a current control member having conductive and non-conductive states and normally being in the non-conductive states;

means including the two conductors for producing a state of conductivity in the current control member upon each closure of the two conductors;

a coil connected to the current control member for receiving a pulse of current upon each production of a state of conductivity in the current control member; and a counter coupled to the coil to provide an indication of the number of pulses of current in the coil.

8. The combination set forth in claim 7 wherein the current control member is a semi-conductor and wherein means are connected to the semi-conductor and the coil to protect the semi-conductor after each current pulse.

References Cited

UNITED STATES PATENTS

| | | | |
|---|---|---|---|
| 2,557,450 | 6/1951 | Mentzel | 235—92 |
| 3,064,888 | 11/1962 | Van de Mark | 235—92 |
| 3,254,836 | 6/1966 | Corpian | 235—64 |

MAYNARD R. WILBUR, *Primary Examiner.*

G. MAIER, *Assistant Examiner.*